US006374855B1

(12) United States Patent
Hansen

(10) Patent No.: US 6,374,855 B1
(45) Date of Patent: Apr. 23, 2002

(54) DIAPHRAGM VALVE

(76) Inventor: Albert Frederick Hansen, 156 Lower Dent Street, Whangarei (NZ)

(*) Notice: Subject to any disclaimer, the term of this patent is extended or adjusted under 35 U.S.C. 154(b) by 0 days.

(21) Appl. No.: 09/180,260

(22) PCT Filed: May 8, 1997

(86) PCT No.: PCT/NZ97/00056

§ 371 Date: Mar. 3, 2000

§ 102(e) Date: Mar. 3, 2000

(87) PCT Pub. No.: WO97/42438

PCT Pub. Date: Nov. 13, 1997

(30) Foreign Application Priority Data

May 8, 1996 (NZ) .................................. 286543
Oct. 11, 1996 (NZ) .................................. 299570

(51) Int. Cl.[7] .............................................. F16K 17/02
(52) U.S. Cl. ...................................... 137/510; 137/907
(58) Field of Search ................................ 137/510, 907

(56) References Cited

U.S. PATENT DOCUMENTS

| 3,189,042 A | * | 6/1965 | Kerley et al. ........... 137/510 X |
| 3,746,036 A | * | 7/1973 | Bois et al. ................... 137/496 |
| 4,058,287 A | * | 11/1977 | Fromfield ..................... 251/46 |
| 4,715,578 A | | 12/1987 | Seltzer ......................... 251/25 |
| 4,921,006 A | * | 5/1990 | Evans ......................... 137/554 |

FOREIGN PATENT DOCUMENTS

AU 5129073 7/1974

* cited by examiner

Primary Examiner—Stephen M. Hepperle
(74) Attorney, Agent, or Firm—Dorsey & Whitney LLP

(57) ABSTRACT

A diaphragm valve for the water intake in irrigation systems or similar comprises a hollow body having a port to connect a hydraulic or pneumatic system to the interior of the body of the valve and at least one ventilation opening through a side wall or walls of the body from the exterior to the interior of the valve. A diaphragm is movably mounted within the interior of the body and normally closes the port. There is a bleed aperture through the diaphragm around the guide member to a cavity behind the diaphragm. When the pressure on the port side of the diaphragm falls below the external pressure, the diaphragm will move away from the port to open the port to fluid entering the interior of the body of the valve through the side wall(s) of the body of the valve, and the diaphragm will move to close the port when the pressure on the port side of the diaphragm is equalized with the external pressure. Preferably the diaphragm comprises a thin flexible annular skirt extending from the periphery of the diaphragm with the distal edge of the skirt retained in an annular recess around the cavity behind the diaphragm to movably mount the diaphragm within the interior of the body of the valve so that the diaphragm moves by flexing and/or folding of the skirt.

29 Claims, 4 Drawing Sheets

DIAPHRAGM VALVE

RELATED APPLICATIONS

This application claims the priority of New Zealand patent application no. 286543, filed May 8, 1996, and New Zealand patent application no. 299570, filed Oct. 11, 1996, which are incorporated herein by reference.

FIELD OF INVENTION

The present invention comprises a diaphragm valve, particularly suitable for irrigation applications.

BACKGROUND OF INVENTION

Diaphragm valves of various types are used in various applications. Various designs and constructions for such diaphragm valves are known, which are generally relatively complicated multipart valves.

SUMMARY OF INVENTION

The present invention provides an improved or at least alternative form of diaphragm valve.

In broad terms the invention comprises a diaphragm valve comprising a hollow body having an outlet port to connect a hydraulic or pneumatic system to the interior of the body of the valve and at least one inlet port to the interior of the body of the valve, and a diaphragm movably mounted within the interior of the body and normally closing said outlet port with a cavity behind the diaphragm and a bleed aperture through the diaphragm from said outlet port into the cavity behind the diaphragm, such that when the pressure on the outlet side of the diaphragm falls below the pressure on the inlet side of the diaphragm, the diaphragm will move away from the outlet port to open the port to fluid entering the interior of the body of the valve through the inlet port(s) and will move to close the outlet port when the pressure on the outlet side of the diaphragm is equalized with the pressure on the inlet port side of the diaphragm.

Preferably the diaphragm component includes a thin flexible annular skirt extending from the periphery of the diaphragm with the distal edge of the skirt retained in an annular recess around the cavity behind the diaphragm to movably mount the diaphragm within the interior of the body so that the diaphragm moves by flexing and/or folding of the skirt.

Preferably the skirt is integrally formed with a major part of the body of the diaphragm by injection moulding from a plastics material.

The diaphragm valve of the invention is of a simple and robust construction and may be formed entirely from plastic moulded components, although parts of the diaphragm valve of the invention may also be formed from metal by casting for example, particularly for larger sizes of valves of the invention.

Diaphragm valves of the invention are particularly suitable for use in irrigation systems or similar where water is drawn from a reservoir or stream. The valves of the invention will give reliable long term performance in such demanding applications. The valves of the invention are suitable for other applications also however, and are not limited to irrigation or like applications.

BRIEF DESCRIPTION OF DRAWINGS

The accompanying drawings show preferred forms of diaphragm valves of the invention, by way of example and without intending to be limiting. In the drawings.

DETAILED DESCRIPTION OF PREFERRED FORM

Figure 1:
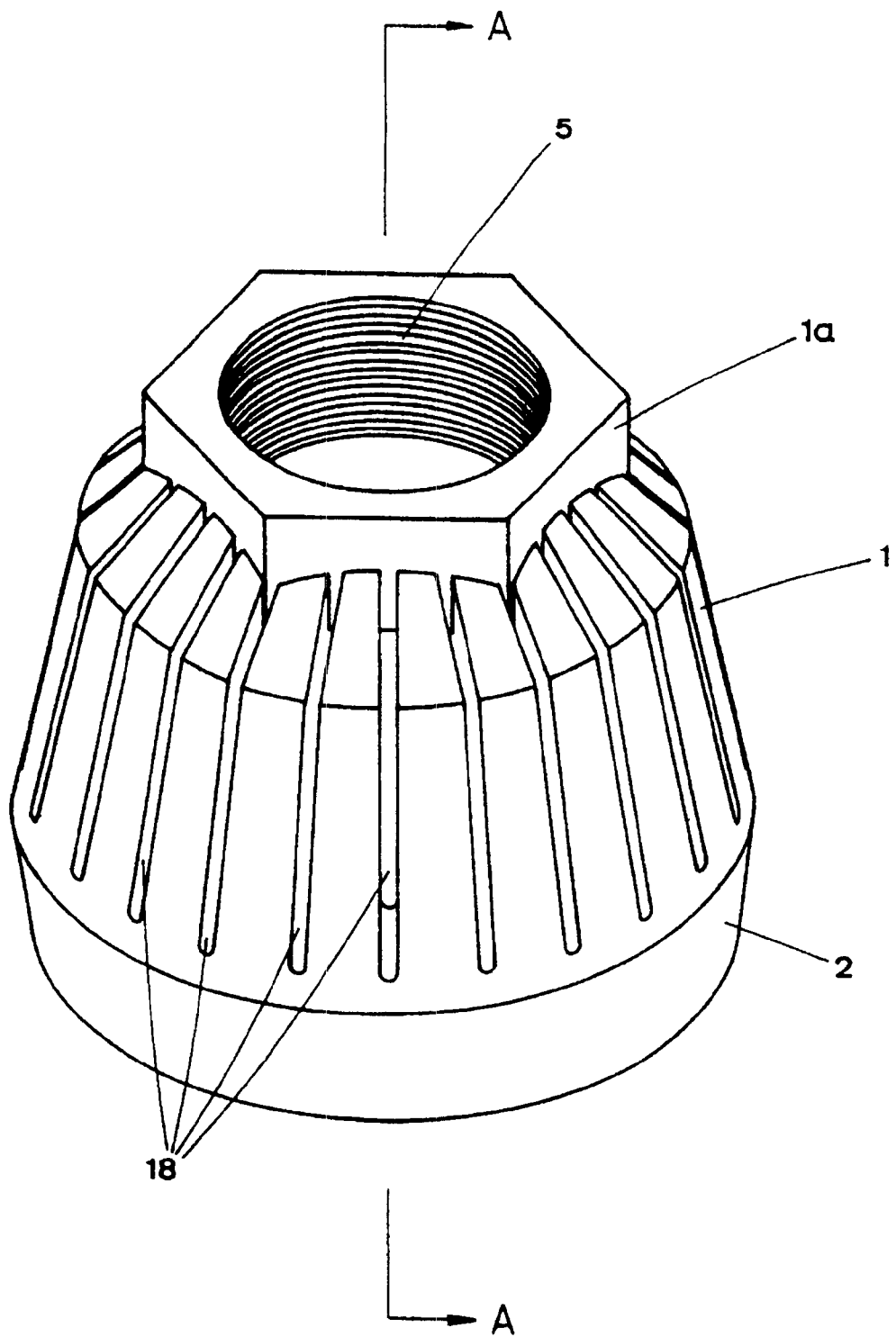
FIG. 1 shows a first preferred form valve assembled.

The body of the first preferred form valve comprises a main body component 1 and an end cap 2 which when the valve is assembled closes the otherwise open end of the main body component 1. The end cap threads on to the threaded annular end 4 of the main body component 1.

The main body component 1 has a hollow interior and an outlet port by which the diaphragm valve may be connected to a pipe system. In the first preferred form valve the outlet port is formed by an aperture 5 through the end of the main body component 1 opposite the end cap 2. The aperture 5 is internally threaded so that the valve may be threaded onto the end of a pipe such as that indicated in broken lines at 6 in FIG. 3, forming part of the pipe system, so that the interior of the pipe communicates through the outlet port 5 and into the interior of the valve. Around the pipe connection aperture or port 5 the body of the valve may be hexagonally shaped with flats 1a to enable the valve to be tightened on to the threaded end of a pipe with a spanner for example. This is not essential as in smaller versions of the valve hand tightening alone may be sufficient.

A circular wall 5a depends from the pipe connection port into the interior of the valve as shown, to form a valve seat. The diaphragm 7 is mounted within the interior of the valve. In the preferred form the diaphragm is generally circular, and comprises a thin annular skirt 7a which extends from the periphery of the side walls 7b of the preferred form diaphragm as shown. The distal edge 7c of the skirt 7a is retained in an annular recess 8 in the end cap 2 as shown.

Figure 2:
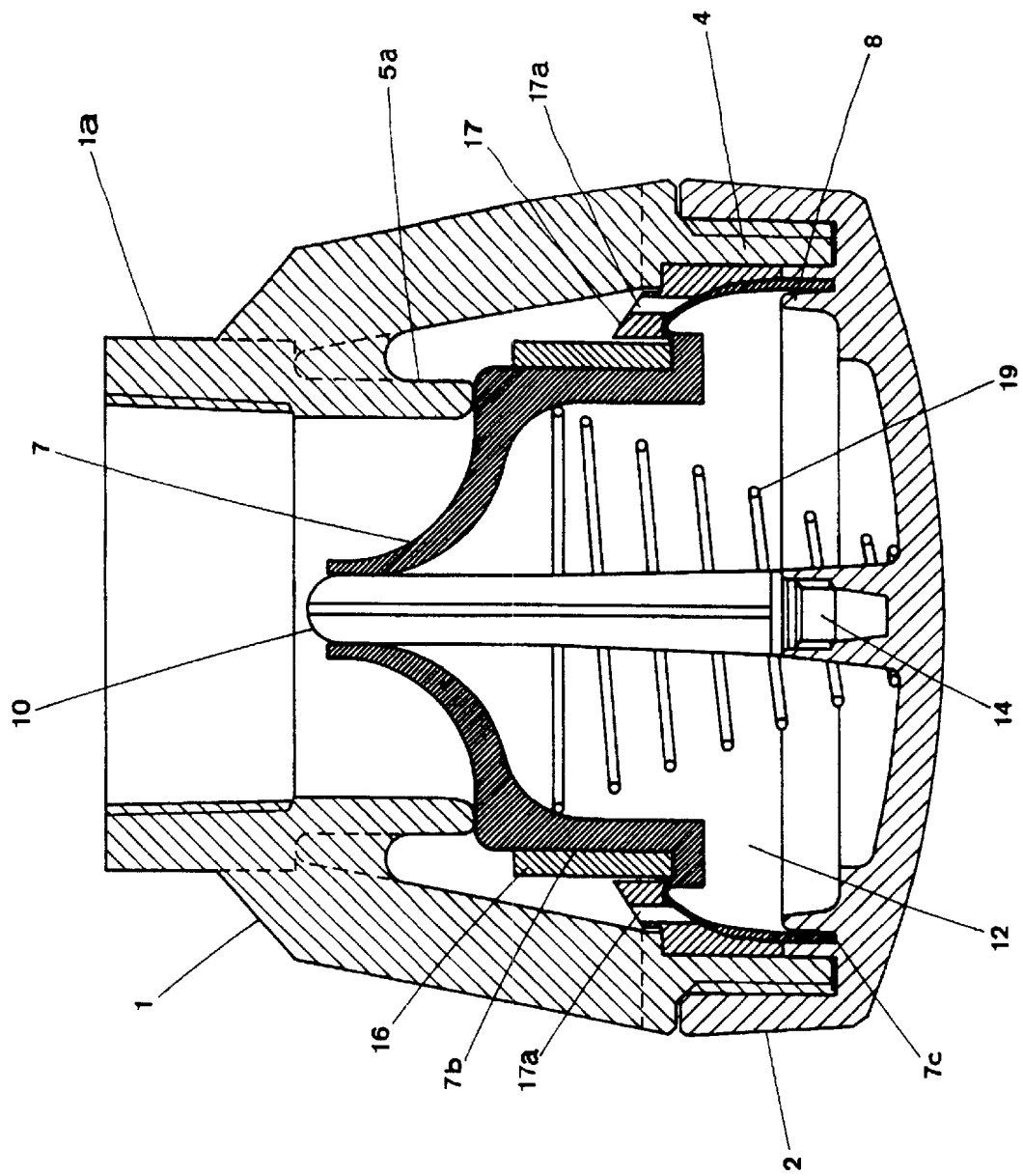
FIG. 2 is a cross-sectional view through the preferred form valve of FIG. 1 along line A—A of FIG. 1 and showing the diaphragm of the valve closing the valve port.
Figure 3:
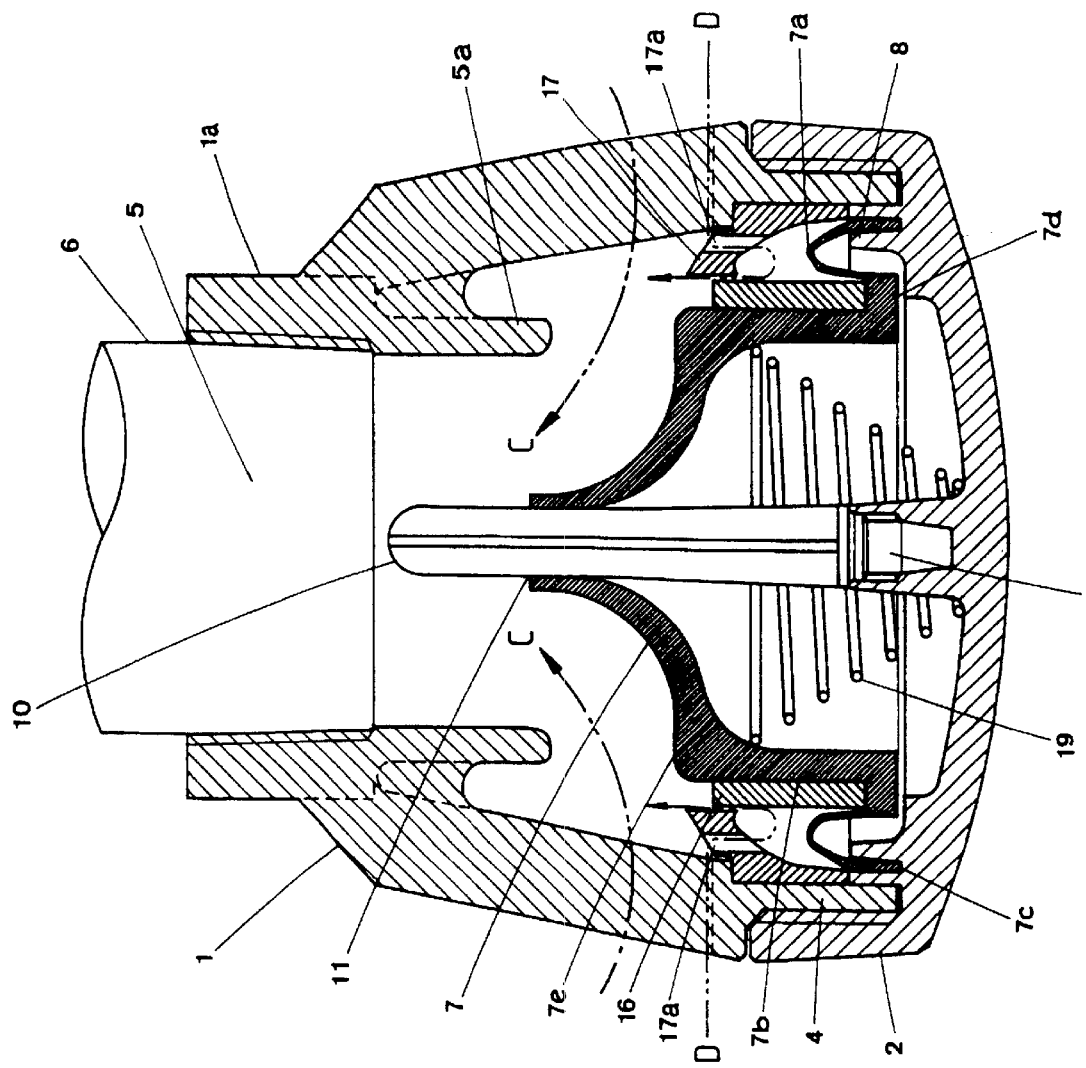
FIG. 3 is a cross-sectional view similar to FIG. 2, through the preferred form valve of FIG. 1, but showing the diaphragm moved away from its normal position to open the valve port to the exterior of the valve.

The skirt 7a is a thin, flexible skirt which can flex and fold to allow the diaphragm to move between the position shown in FIG. 2 where the diaphragm seals against the circular wall 5 to close the outlet port, and the position shown in FIG. 3 where the diaphragm 7 has moved towards the end cap 2 to open the port 5. As the diaphragm moves to its open position as shown in FIG. 3, the thin flexible skirt 7a of the diaphragm flexes and folds to the shape shown in FIG. 3. In the preferred form valve shown in the drawings the front face of the diaphragm 7 is shaped as indicated at 7e to engage the lower edges of the port walls 5a when the diaphragm closes the outlet port.

The diaphragm is a separately moulded plastic component which is simply fitted to the cap 2 so that the edge 7c of the skirt of the diaphragm enters into the annular recess 8 in the cap and the diaphragm is not secured by screws or clamps or similar. This provides for easy assembly and a simple construction and moreover it has been found that the diaphragm will effectively seal for both vacuum and pressure up to relatively high pressures.

The diaphragm valve of FIGS. 1 to 3 is suitable for use in irrigation systems or similar where water is drawn from a reservoir or stream for example by a pump. A pipe from the intake of the pump is connected to the diaphragm valve which is immersed in the water supply to enable water to be drawn into the pump through the valve. In the valve of FIGS. 1 to 3 inlet apertures are formed through the side walls of the body of the valve to the interior, and in the preferred form shown these comprise a number of slots 18 arranged radially around the side walls of the main body component 1 as shown.

Figure 4:
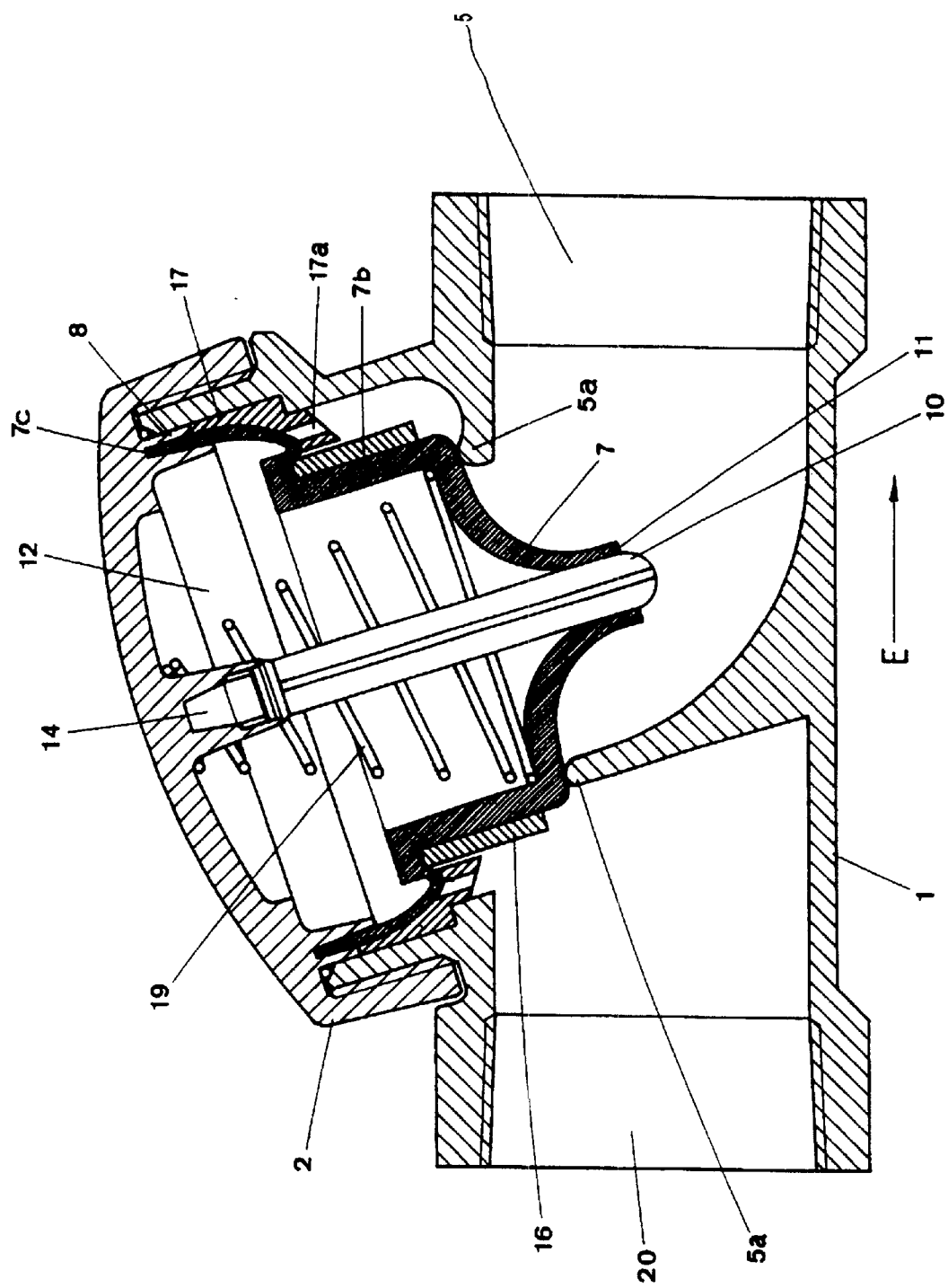
FIG. 4 is a cross-sectional view through a second preferred form of valve of the invention.

The preferred form valve of FIG. 4 is intended to be connected in series in a pipe system. In this form an inlet port 20 is provided on the other side of the main body component 1 of the valve. In FIG. 4 the same reference numerals used in FIGS. 1 to 3 indicate the same components of the valve. The main body component is formed as shown to define a circular valve seat 5a, similar to that formed by the circular wall 5a of the valve of FIGS. 1 to 3. In FIG. 4 arrow E indicates the direction of fluid flow through the valve (when the valve is opened).

In the preferred forms the diaphragm 7 including the integral skirt 7a are formed from a softer plastics material and the diaphragm has side walls 7b and an annular flange 7d, and a ring 16 of a harder material such as a harder plastics material is captured around the side walls 7b of the diaphragm as shown. An annular member 17 surrounding the diaphragm is fitted within the main body of the valve, and is retained in place when the cap 2 is screwed home. As the diaphragm moves during opening and closing in normal operation of the valve, the plastic ring 16 around the side was of the diaphragm slides within the annular member 17, which helps to locate and guide movement of the diaphragm. In an alternative arrangement the annular member 17 may be integrally formed as part of the body of the diaphragm as an integral zone in the side wall of the diaphragm for example, if production techniques allow.

Preferably the annular member 17 has a top edge shape which slopes down towards the cap 2 from its inner circumference which improves the fluid flow and minimises flow direction change disruption through the valve when the diaphragm is in the open position.

Preferably the annular member 17 has a series of holes 17a extending from the shaped top edge of the member 17 through the member 17 towards the outer surface 7a of the diaphragm. The holes 17a are preferably equi-spaced around the member 17. These holes 17a allow the diaphragm valve to be self cleaning by allowing a flow of fluid to be carried over the flexible skirt 7a of the diaphragm and out through the gap between the annular member 17 and the support ring 16, as indicated by arrows D in FIG. 3, at a velocity sufficient to ensure that any material being carried by the fluid is not able to settle out and cause the valve to malfunction. This feature is particularly useful when the valve is used with fluids that contain a significant burden of heavy materials. In the first preferred form valve of FIGS. 1 to 3 these holes are vertical and aligned with the external slots 18 of the body 1.

A guide member 10 extends centrally from the cap 2 through an aperture 11 in the centre of the diaphragm 7 and towards the outlet port 5. The guide member 10 may be formed as a separate component from the cap 2 and threaded or otherwise connected to the cap as indicated at 14. The aperture through the centre of the diaphragm around the guide member 10 is slightly larger than the diameter of the member 10 and forms a bleed aperture through the diaphragm from the outlet port to the cavity or space 12 behind the diaphragm, between the rear side of the diaphragm and the cap 2. The guide member 10 is not essential but is preferred to ensure reliable operation of the diaphragm. In the preferred form the guide member 10 has a cruciform shape in cross-section.

Preferably a spring 19 is positioned between the cap 2 and the diaphragm to aid skirt 7a in closing the diaphragm. The spring 19 is not essential but can be used to ensure reliable operation of the diaphragm.

In operation, if the pressure at the outlet port 5 falls ie there is a relative vacuum in the pipe system to which the valve is connected, produced by a pump for example, there will also be a reduction in pressure via the bleed aperture 11 through the diaphragm in the cavity 12 behind the diaphragm, and relative to the exterior of the valve in the valve of FIGS. 1 to 3 or relative to the inlet port 20 in the valve of FIG. 4. This relative pressure imbalance will cause the diaphragm 7 to move towards the cap 2, from the position shown in FIG. 2 to that shown in FIG. 3, thus opening the outlet port 5 to the interior of the valve to allow fluid to pass through the slots 18 in the side walls of the coupling body 1 and through the outlet port 5, as indicated by arrows C in FIG. 3. The shaped top of the annular member 17 causes the fluid to operate against the top surface of the diaphragm 7 thereby causing the diaphragm to move towards the cap 2 further, and increasing the fluid flow through the valve. Subsequently the natural resilience of the thin flexible skirt 7a of the diaphragm together with the spring 19 will cause the diaphragm to pop or spring back to its original position shown in FIG. 2 to close the port 5. The operation of the valve of FIG. 4 is identical, except that fluid enters the valve through inlet port 20.

As stated, preferably the diaphragm 7 is formed as a single injection moulded plastics component comprising the main body 7 of the diaphragm and the thin flexible skirt 7a.

Diaphragm valves of the invention may be formed in large and small sizes. Because the valve comprises relatively few components it is inherently robust and reliable in operation, and all of the components of the valve maybe formed by injection moulding, or by metal casting for larger versions if desired.

The foregoing describes the invention including preferred forms thereof. Alterations and modifications as well be obvious to those skilled in the art are intended to be incorporated within the scope hereof as defined in the following claims.

What is claimed is:

1. A diaphragm valve comprising a hollow body having one port to connect a hydraulic or pneumatic system to the interior of the body of the valve and another port to the interior of the body of the valve, and a diaphragm movably mounted within the interior of the body and normally closing said one port, the diaphragm including side walls and a thin flexible annular skirt extending from the periphery of the diaphragm and integrally formed with a major part of the body of the diaphragm, the diaphragm including side walls and said annular skirt being formed from a softer plastics material by injection moulding, and a ring of a harder material captured around the side walls of the diaphragm, the distal edge of said skirt of the diaphragm being retained in an annular recess around a cavity behind the diaphragm to movably mount the diaphragm within the interior of the body of the valve so that the diaphragm moves by flexing and/or folding of the skirt, said ring moving in a sliding fit within a corresponding annular aperture within the body of the valve during movement of the diaphragm, and a bleed aperture through the diaphragm from said one port into the cavity behind the diaphragm, such that when the pressure in said cavity behind the diaphragm falls below the pressure on the other side of the diaphragm, the diaphragm will move away from said one port to open said one port to the interior of the body of the valve and will move to close said one port when the pressure in said cavity behind the diaphragm is equalised with the pressure on the other side of the diaphragm.

2. A diaphragm valve according to claim 1 wherein the hollow body of the valve comprises a main body component and a cap, and said annular recess is formed in the inside face of the cap so that the cavity behind the diaphragm is defined between the inside face of the cap and the diaphragm.

3. A diaphragm valve according to claim 1 wherein a guide member extends centrally from the inside face of the end cap through the bleed aperture through the diaphragm.

4. A diaphragm valve according to claim 2 wherein a guide member extends centrally from the inside face of the end cap through the bleed aperture through the diaphragm.

5. A diaphragm valve according to claim 1 wherein said another port comprises at least one ventilation opening through a side wall or walls of the body of the valve from the exterior to the interior of the valve.

6. A diaphragm valve according to claim 2 wherein said another port comprises at least one ventilation opening through a side wall or walls of the body of the valve from the exterior to the interior of the valve.

7. A diaphragm valve according to claim 3 wherein said another port comprises at least one ventilation opening through a side wall or walls of the body of the valve from the exterior to the interior of the valve.

8. A diaphragm valve according to claim 4 wherein said another port comprises at least one ventilation opening through a side wall or walls of the body of the valve from the exterior to the interior of the valve.

9. A diaphragm valve comprising a hollow body having a port to connect a hydraulic or pneumatic system to the interior of the body of the valve and at least one ventilation opening through a side wall or walls of the body from the exterior to the interior of the valve, and a diaphragm movably mounted within the interior of the body and normally closing said port, the diaphragm including side walls and a thin flexible annular skirt extending from the periphery of the diaphragm and integrally formed with a major part of the body of the diaphragm, the diaphragm including side walls and said annular skirt being formed from a softer plastics material by injection moulding, and a ring of a harder material captured around the side walls of the diaphragm, the distal edge of said skirt of the diaphragm being retained in an annular recess around a cavity behind the diaphragm to movably mount the diaphragm within the interior of the body of the valve so that the diaphragm moves by flexing and/or folding of the skirt, said ring moving in a sliding fit within a corresponding annular aperture within the body of the valve during movement of the diaphragm, and a bleed aperture through the diaphragm from said port into the cavity behind the diaphragm, such that when the pressure on the port side of the diaphragm falls below the external pressure, the diaphragm will move away from the said port to open the port to fluid entering the interior of the body of the valve through the ventilation opening(s) through the side wall(s) of the body of the valve, and will move to close the said port when the pressure on the port side of the diaphragm is equalized with the external pressure.

10. A diaphragm valve according to claim 9 wherein the hollow body of the valve comprises a main body component and a cap, and said annular recess is formed in the inside face of the cap so that the cavity behind the diaphragm is defined between the inside face of the cap and the diaphragm.

11. A diaphragm valve according to claim 9 wherein a guide member extends centrally from the inside face of the end cap through the bleed aperture through the diaphragm.

12. A diaphragm valve comprising a hollow body including a main body component and a cap closing one end of the main body component, the main body component having one port to connect a hydraulic or pneumatic system to the interior of the body of the valve and another port to the interior of the body of the valve, and a diaphragm movably mounted within the interior of the body and normally closing said one port, the diaphragm including a thin flexible annular skirt extending from the periphery of the diaphragm and formed from a resiliently flexible material, the distal edge of said skirt of the diaphragm being sealingly retained in an annular recess around a cavity behind the diaphragm, said annular recess being formed in the inside face of the cap so that the cavity behind the diaphragm is defined between the inside face of the cap and the diaphragm, to movably mount the diaphragm within the interior of the body of the valve so that the diaphragm moves by flexing and/or folding of the skirt, and a bleed aperture through the diaphragm from said one port into the cavity behind the diaphragm, such that when the pressure in said cavity behind the diaphragm falls below the pressure on the other side of the diaphragm, the diaphragm will move away from said one port to open said one port to the interior of the body of the valve and will move to close said one port when the pressure in said cavity behind the diaphragm is equalized with the pressure on the other side of the diaphragm.

13. A diaphragm valve according to claim 12 wherein the cap is a screw fit on to the main body component of the valve.

14. A diaphragm valve according to claim 12 wherein a guide member extends centrally from the inside face of the end cap through the bleed aperture through the diaphragm.

15. A diaphragm valve according to claim 13 wherein a guide member extends centrally from the inside face of the end cap through the bleed aperture through the diaphragm.

16. A diaphragm valve according to claim 12 wherein said thin flexible annular skirt extending from the periphery of the diaphragm is integrally formed with a major part of the body of the diaphragm from a soft plastics material and the diaphragm comprises a ring of a harder material captured around the side walls of the diaphragm which moves within a corresponding annular aperture within the body of the valve during movement of the diaphragm.

17. A diaphragm valve according to claim 13 wherein said thin flexible annular skirt extending from the periphery of the diaphragm is integrally formed with a major part of the body of the diaphragm from a soft plastics material and the diaphragm comprises a ring of a harder material captured around the side walls of the diaphragm which moves within a corresponding annular aperture within the body of the valve during movement of the diaphragm.

18. A diaphragm valve according to claim 14 wherein said thin flexible annular skirt extending from the periphery of the diaphragm is integrally formed with a major part of the body of the diaphragm from a soft plastics material and the diaphragm comprises a ring of a harder material captured around the side walls of the diaphragm which moves within a corresponding annular aperture within the body of the valve during movement of the diaphragm.

19. A diaphragm valve according to claim 15 wherein said thin flexible annular skirt extending from the periphery of the diaphragm is integrally formed with a major part of the body of the diaphragm from a soft plastics material and the diaphragm comprises a ring of a harder material captured around the side walls of the diaphragm which moves within a corresponding annular aperture within the body of the valve during movement of the diaphragm.

20. A diaphragm valve according to claim 12 wherein said another port comprises at least one ventilation opening through a side wall or walls of the body of the valve from the exterior to the interior of the valve.

21. A diaphragm valve according to claim 13 wherein said another port comprises at least one ventilation opening through a side wall or walls of the body of the valve from the exterior to the interior of the valve.

22. A diaphragm valve according to claim 14 wherein said another port comprises at least one ventilation opening through a side wall or walls of the body of the valve from the exterior to the interior of the valve.

23. A diaphragm valve according to claim 15 wherein said another port comprises at least one ventilation opening through a side wall or walls of the body of the valve from the exterior to the interior of the valve.

24. A diaphragm valve according to claim 16 wherein said another port comprises at least one ventilation opening through a side wall or walls of the body of the valve from the exterior to the interior of the valve.

25. A diaphragm valve according to claim 17 wherein said another port comprises at least one ventilation opening through a side wall or walls of the body of the valve from the exterior to the interior of the valve.

26. A diaphragm valve according to claim 18 wherein said another port comprises at least one ventilation opening through a side wall or walls of the body of the valve from the exterior to the interior of the valve.

27. A diaphragm valve according to claim 17 wherein said another port comprises at least one ventilation opening through a side wall or walls of the body of the valve from the exterior to the interior of the valve.

28. A diaphragm valve comprising a hollow body including a main body component and a cap closing one end of the main body component, the main body component having a port to connect a hydraulic or pneumatic system to the interior of the body of the valve and at least one ventilation opening through a side wall or walls of the body from the exterior to the interior of the valve, and a diaphragm movably mounted within the interior of the body and normally closing said port, the diaphragm including side walls and a thin flexible annular skirt extending from the periphery of the diaphragm and integrally formed with a major part of the body of the diaphragm and formed from a resiliently flexible material, the distal edge of said skirt of the diaphragm being sealingly retained in an annular recess around a cavity behind the diaphragm, said annular recess being formed in the inside face of the cap so that the cavity behind the diaphragm is defined between the inside face of the cap and the diaphragm, to movably mount the diaphragm within the interior of the body of the valve so that the diaphragm moves by flexing and/or folding of the skirt, and a bleed aperture through the diaphragm from said port into the cavity behind the diaphragm, such that when the pressure on the port side of the diaphragm falls below the external pressure, the diaphragm will move away from the said port to open the port to fluid entering the interior of the body of the valve through the ventilation opening(s) through the side wall(s) of the body of the valve, and will move to close the said port when the pressure on the port side of the diaphragm is equalized with the external pressure.

29. A diaphragm valve according to claim 28 wherein a guide member extends centrally from the inside face of the end cap through the bleed aperture through the diaphragm.

* * * * *

UNITED STATES PATENT AND TRADEMARK OFFICE
CERTIFICATE OF CORRECTION

PATENT NO.    : 6,374,855 B1
DATED         : April 23, 2002
INVENTOR(S)   : Albert Frederick Hansen It is certified that error appears in the above-identified patent and that said Letters Patent is hereby corrected as shown below:

Column 3,
Line 28, please delete "was" and insert -- walls -- therefor.
Line 64, please delete "port" and insert -- port 5 -- therefor.

Column 4,
Line 37, please delete "maybe" and insert -- may be -- therefor.
Line 41, please delete "well" and insert -- will -- therefor.

Column 7,
Line 32, please delete "claim 17" and insert -- claim 19 -- therefor.

Signed and Sealed this

Eighth Day of October, 2002

Attest:

JAMES E. ROGAN
Attesting Officer      Director of the United States Patent and Trademark Office